UNITED STATES PATENT OFFICE.

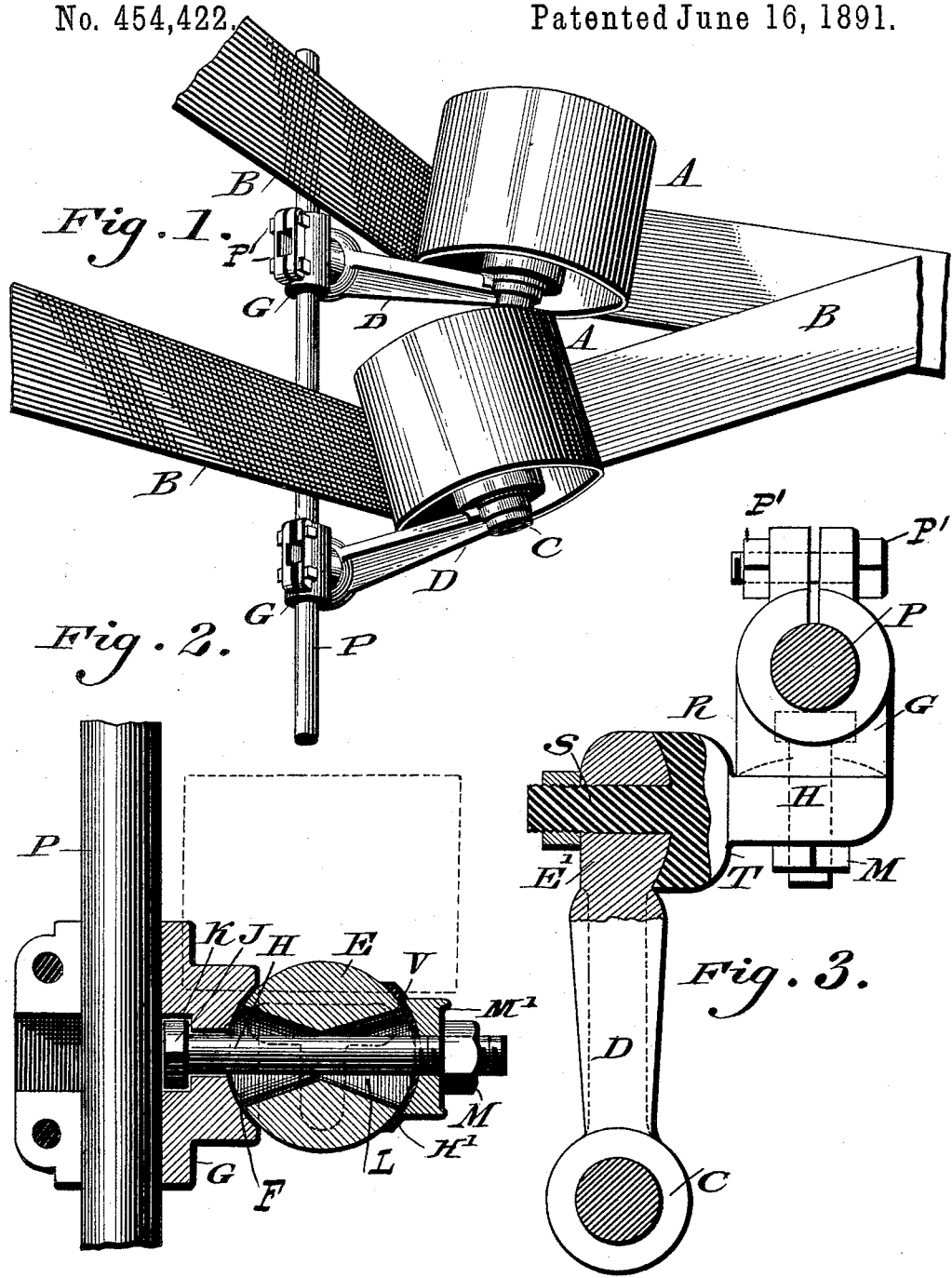

THOMAS S. BROWN, OF PHILADELPHIA, PENNSYLVANIA, ASSIGNOR TO THE FAIRMOUNT MACHINE COMPANY, OF PENNSYLVANIA.

UNIVERSAL JOINT AND SUPPORT FOR PULLEYS.

SPECIFICATION forming part of Letters Patent No. 454,422, dated June 16, 1891.

Application filed November 11, 1890. Serial No. 371,088. (No model.)

*To all whom it may concern:*

Be it known that I, THOMAS S. BROWN, a citizen of the United States, residing in the city and county of Philadelphia, State of Pennsylvania, have invented a new and useful Improvement in Universal Joints and Supports for Pulleys, &c., which improvement is fully set forth in the following specification and accompanying drawings.

My invention consists of a universal or ball-and-socket joint and support for pulleys, &c., as hereinafter described.

Figure 1 represents a perspective view of pulleys mounted on supports having universal or ball-and-socket joints embodying my invention. Fig. 2 represents a sectional view of the support and joint. Fig. 3 represents a sectional view of a modification thereof.

Similar letters of reference indicate corresponding parts in the several figures.

Referring to the drawings, A A designate pulleys for carrying the belts B B. The axles or shafts C of the said pulleys are connected with the arms or supports D, which are provided at one end with a ball-bearing E, which is adapted to move in the socket F of the clamp-hub G, to which latter the said ball E is secured by the bolt H, having a head portion J held in a recess K in the said clamp-hub and its shank in the recessed portion L of the ball, its screw-threaded end having a nut M thereon to clamp or bind the ball E with the arm D in place. The recessed portion L of the ball is of double conical form, the smaller part being at the center of the ball, as seen in Fig. 2. The clamp-hub G is secured in place on a supporting-rod P by means of clamping screws or bolts P', binding the separate sections or portions of the hub together on said rod. It will be seen that the arm D has, when the nut M is loosened, a play, owing to the liberty of movement of the ball E, whereby it, with the shaft of the pulley, may be adjusted or moved as required to run the belt in the proper direction. As shown in Fig. 2, the outer end of bolt H is provided with a clamping-nut M', having a concave face, and between said nut and ball-bearing is inserted an elastic gasket or frictional device H', which is adapted to hold the said bearing against movement when the nut M is tightened.

In Fig. 3 is shown a modification of the device. Instead of a ball-bearing E, the end of the arm D is provided with a curved face E', which is adjustable in the socket R and on the stud S of the joint-piece T. The other end of the piece T is adjustable at right angles to the arm D in the socket F of the clamp-hub G, and is clamped in place by a nut M on the bolt H. It will be seen that the arm D has a movement in one direction on the joint T, and the said joint T has a movement at right angles to said direction on the clamp-hub G, whereby a universal adjustment of the arm D on the clamp-hub G is had.

Having thus described my invention, what I claim as new, and desire to secure by Letters Patent, is—

1. A support for a pulley, comprising a ball having an opening therein and a bolt of less diameter than the opening in said ball, and means for clamping said parts, substantially as described.

2. A clamp-hub having a concave socket and a bolt, an arm having a ball-bearing in connection therewith, formed with an opening, through which said bolt passes, clamping-nuts, and a frictional device between said clamping-nuts and the said wall, said parts being combined substantially as described.

3. A shaft or supporting-arm, a ball-bearing connected with said arm and having a double conical recess, a hub adapted to be secured to a support, a bolt with its head in said hub and its body in said conical recess of the ball-bearing, and a clamping-nut on the end of said bolt, said parts being combined substantially as described.

THOS. S. BROWN.

Witnesses:
CHAS. E. PANCOAST,
JOHN P. FOREMAN.